(12) United States Patent
Grier et al.

(10) Patent No.: US 8,921,763 B2
(45) Date of Patent: Dec. 30, 2014

(54) EXTENDED AND KNOTTED OPTICAL TRAPS IN THREE DIMENSIONS

(75) Inventors: David G. Grier, New York, NY (US); Elisabeth R. Shanblatt, East Lansing, MI (US)

(73) Assignee: New York University, New York, NY (US)

(*) Notice: Subject to any disclaimer, the term of this patent is extended or adjusted under 35 U.S.C. 154(b) by 124 days.

(21) Appl. No.: 13/411,142

(22) Filed: Mar. 2, 2012

(65) Prior Publication Data
US 2012/0223219 A1 Sep. 6, 2012

Related U.S. Application Data

(60) Provisional application No. 61/464,445, filed on Mar. 4, 2011, provisional application No. 61/451,705, filed on Mar. 11, 2011.

(51) Int. Cl.
| | | |
|---|---|---|
| G03H 1/00 | (2006.01) | |
| G02B 5/32 | (2006.01) | |
| G03H 1/08 | (2006.01) | |
| G03H 1/22 | (2006.01) | |

(52) U.S. Cl.
CPC ..... *G03H 1/0005* (2013.01); *G03H 2001/0077* (2013.01); *G02B 5/32* (2013.01); *G03H 2210/12* (2013.01); *G03H 2001/2255* (2013.01); *G03H 1/2294* (2013.01); *G03H 2210/11* (2013.01); *G03H 1/0808* (2013.01)
USPC .............................. 250/251; 250/216; 359/15

(58) Field of Classification Search
USPC ......................................................... 250/251
See application file for complete search history.

(56) References Cited

U.S. PATENT DOCUMENTS 8,174,742 B2 * 5/2012 Roichman et al. ................ 359/1

OTHER PUBLICATIONS

Sang-Hyuk Lee et al, "Holographic microscopy of holographically trapped three-dimensional structures", Optics Express/ vol. 15, No. 4 / Feb. 19, 2007, pp. 1505-1512.*
Bouchal et al., Controllable 3D spatial localization of light fields synthesized by non-diffracting modes, Journal of Modern Optics, Jul. 3, 2009, 21 pages.
Chavez-Cerda et al., Nondiffracting beams: travelling, standing, rotating and spiral waves, Optics Communications 123, pp. 225-233, May 1995, 9 pages.
Cizmar et al., Sub-micron particle organization by self-imaging of non-diffracting beams, New Journal of Physics 8, Mar. 24, 2006, 24 pages.
Courtial et al., Iterative algorithms for holographic shaping of non-diffracting and self-imaging light beams, Opt. Express 14, 2108-2116 (2006), 9 pages.
Dennis et al., Isolated optical vortex knots, Nature Physics, vol. 6, Feb. 2010, 4 pages.
Durnin et al., Diffraction-Free Beams, Physical Review Letters, vol. 58, No. 15, Apr. 13, 1987, 3 pages.

(Continued)

*Primary Examiner* — Phillip A Johnston
(74) *Attorney, Agent, or Firm* — Foley & Lardner LLP (57) ABSTRACT

The present invention is directed toward a system and method for projecting holographic optical traps whose intensity maxima are extended along specified paths in three dimensions with specified amplitude and phase profiles along those paths. Specifying paths that constitute knotted loops and phase profiles that direct radiation pressure along the knotted paths yields optical traps that exert knotted force fields. Knotted optical force fields have uses for inducing motion along knotted paths, with applications including the generation of knotted electric current loops in plasmas.

20 Claims, 4 Drawing Sheets

(56) References Cited

OTHER PUBLICATIONS

Faddeev et al., Stable knot-like structures in classical field theory, Nature, vol. 387, May 1, 1997, 4 pages.

Garces-Chavez et al., Simultaneous micromanipulation in multiple planes using a self-reconstructing light beam, letters to nature, Nature, vol. 419, Sep. 12, 2002, 3 pages.

Irvine et al., Linked and knotted beams of light, nature physics, vol. 4, Sep. 2008, 5 pages.

Kotlyar et al., An algorithm for the generation of laser beams with longitudinal periodicity: Rotating images, Journal of Modern Optics, vol. 44, No. 7, pp. 1409-1416, 1997, 9 pages.

Leach et al., Interactive approach to optical tweezers control, Applied Optics, vol. 45, No. 5, Feb. 10, 2006, 7 pages.

Lee et al., Robustness of holographic optical traps against phase scaling errors, Optics Express, vol. 13, No. 19, Sep. 19, 2005, 8 pages.

Mower et al., Knotted threads of darkness, Nature, vol. 432, Nov. 11, 2004, 2 pages.

O'Neil et al., Intrinsic and Extrinsic Nature of the Orbital Angular Momentum of a Light Beam, Physical Review Letters, The American Physical Society, vol. 88, No. 5, Feb. 4, 2002, 4 pages.

Overfelt, Scalar optical beams with helical symmetry, The American Physical Society, Physical Review A, vol. 46, No. 6, Sep. 15, 1992, 7 pages.

Paakkonen et al., Rotating optical fields: experimental demonstration with diffractive optics, Journal of Modern Optics, vol. 45, No. 11, p. 2355-2369, 16 pages.

Roichman et al., Optical Forces Arising from Phase Gradients, Physical Review Letters, The American Physical Society, Jan. 11, 2008, 4 pages.

Roichman et al., Projecting extended optical traps with shape-phase holography, Optics Letters, vol. 31, No. 11, Jun. 1, 2006, 3 pages.

Roichman et al., Three-dimensional holographic ring traps, Oct. 25, 2006, 4 pages.

Roichman et al., Volumetric imaging of holographic optical traps, Optics Express, vol. 14, No. 22, Oct. 30, 2006, 6 pages.

Sherman, Application of the Convolution Theorem to Rayleigh's Integral Formulas, Letters to the Editor, Apr. 1967, 2 pages.

\* cited by examiner

EXTENDED AND KNOTTED OPTICAL TRAPS IN THREE DIMENSIONS

CROSS-REFERENCE TO RELATED PATENT APPLICATIONS

This application claims priority from U.S. Provisional Application 61/464,445 filed Mar. 4, 2011 which is incorporated herein by reference in its entirety. This application also claims priority from U.S. Provisional Application 61/451,705 filed Mar. 11, 2011 which is incorporated herein by reference in its entirety.

STATEMENT OF GOVERNMENT INTEREST

The United States Government has rights in the invention described herein pursuant to Grant Number DMR-0820341 by the MRSEC Program of the National Science Foundation.

BACKGROUND OF THE INVENTION

Light previously has been used to detect and probe objects. For example, the use of optical traps or tweezers have been known for some time and extensively utilized in various fields of study. More recently, light has been used to move objects in addition to trapping them. Extended optical traps are structured light fields whose intensity and phase gradients exert forces that confine microscopic objects to one-dimensional curves in three dimensions. Intensity-gradient forces typically are responsible for trapping in the two transverse directions, while radiation pressure directed by phase gradients can move particles along the third. This combination of trapping and driving has been demonstrated dramatically in optical vortexes, ring-like optical traps that are created by focusing helical modes of light. Intensity gradients draw illuminated objects toward the ring, and phase gradients then drive them around. More recently, holographic methods have been introduced to design and project more general optical traps that are extended along lines, rings and helices, with intensity and phase profiles independently specified along their lengths. Unlike optical vortexes, these traps feature nearly ideal axial intensity gradients because they are specifically designed to achieve diffraction-limited focusing.

SUMMARY OF THE INVENTION

One embodiment of the invention relates to a method of creating a knotted optical trap. A collimated beam of light is generated. A hologram is imprinted on the beam of light. The beam of light is projected through an objective lens. The projected beam of light is focused along a curve $\vec{R}_0(s)=(x_0(s),y_0(s),z_0(s))$, parameterized by its arc length s, along which the amplitude $a_0(s)$ and phase $\phi_0(s)$ are specified.

Another embodiment relates to an apparatus for creating a knotted optical trap. The apparatus includes a collimated light source, a spatial light modulator, and an objective lens. A beam of light from the collimated light is imprinted by the spatial light modulated with a hologram projecting the beam of light along a curve $\vec{R}_0(s)=(x_0(s),y_0(s),z_0(s))$, parameterized by its arc length s, along which the amplitude $a_0(s)$ and phase $\phi_0(s)$ are specified.

Another embodiment relates to a method for controlling plasma. A knotted optical trap is projected in the plasma. A knotted current loop is initiated in the plasma such that the magnetic field lines of the current loop do not pass through each other.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

FIG. 2(b) is a horizontal section near the midplane showing tilt around the y axis. FIG. 2(c) is a vertical section along the x axis. FIG. 2(d) is a vertical section along the y axis.

The foregoing and other objects, aspects, features, and advantages of the disclosure will become more apparent and better understood by referring to the following description taken in conjunction with the accompanying drawings, in which:

DETAILED DESCRIPTION OF THE PREFERRED EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

One embodiment of the present invention relates to a method for designing and projecting optical traps whose intensity maxima trace out more general curves in three dimensions with independently specified phase and amplitude profiles. Within limitations set by Maxwell's equations, these three-dimensional light fields can be used to trap and move microscopic objects. As set forth below, one embodiment of a technique is demonstrated for projecting diffraction-limited holographic ring traps with arbitrary orientations in three dimensions.

Figure 1:
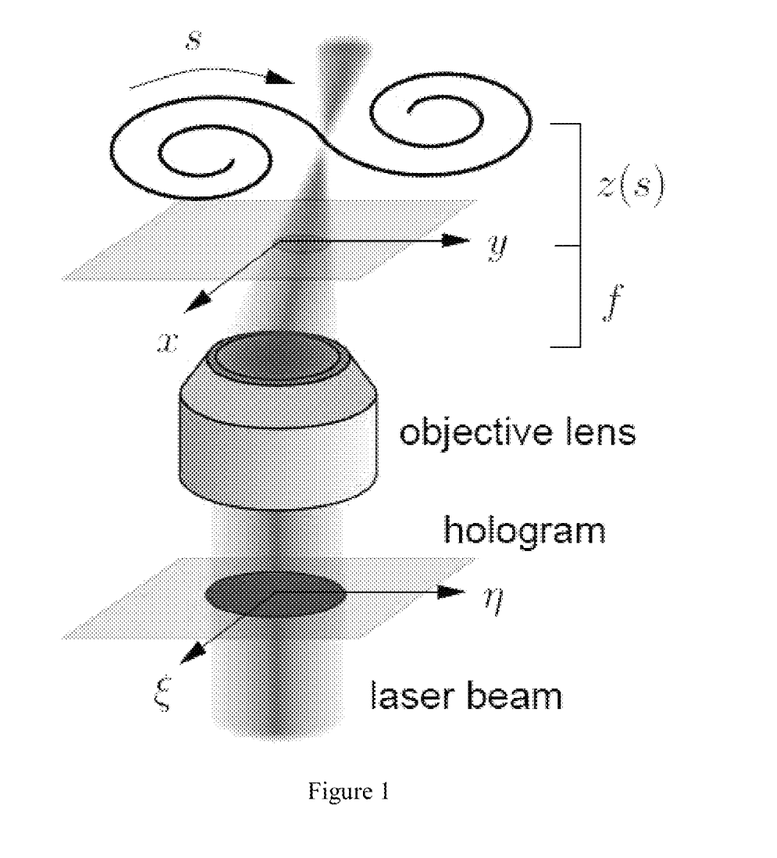
FIG. 1 Projecting three-dimensionally extended holographic traps. A laser beam is imprinted with a hologram in the input pupil of an objective lens. The hologram is projected through the objective's focal plane, and comes to a focus along three-dimensional curve parameterized by its arc length, s.

More specifically, a beam of light is projected that comes to a focus along a curve $\vec{R}_0(s)=(x_0(s),y_0(s),z_0(s))$, parameterized by its arc length s, along which the amplitude $a_0(s)$ and phase $\phi_0(s)$ also are specified. The three-dimensional light field $u(\vec{r},z)$ embodying this extended optical trap is projected by a lens of focal length f, and so passes through the lens' focal plane where its value is $u_f(\vec{r},0)=u_f(\vec{r})$. Associated with $u_f(\vec{r})$ is the conjugate field $u_h(\vec{r})$ in the back focal plane of the lens, which is controllable. A hologram that imprints this field onto the wavefronts of an otherwise featureless laser beam will project the desired trapping pattern $u(\vec{r}, z)$ downstream of the lens, as illustrated in FIG. 1.

The ideal hologram, $u_h(\vec{\rho})=a_h(\vec{\rho})\exp(i\phi_h(\vec{\rho}))$, is characterized by a real-valued amplitude $a_h(\vec{\rho})$ and phase $\phi_h(\vec{\rho})$ both of which vary with position $\vec{\rho}=(\xi,\eta)$ in the back focal plane. It is related to the projected field, $u_f(\vec{r})$, by a Fresnel transform $$u_h(\vec{\rho}) = \frac{k}{2\pi i}\int_\Omega u_f(\vec{r})\exp\left(i\frac{k}{f}\vec{r}\cdot\vec{\rho}\right)d^2r, \quad (1)$$

where $k=2\pi n_m/\lambda$ is the wavenumber of light of vacuum wavelength $\lambda$ in a medium of refractive index $n_m$, and where $\Omega$ is the effective aperture of the optical train. In the limit that the aperture is large, $u_h(\vec{\rho})$ is related to the Fourier transform, $\tilde{u}_f(\vec{q})$, of $u_f(\vec{r})$ by $$u_h(\vec{\rho}) = -\frac{i}{\lambda}\tilde{u}_f(\vec{q}) \quad (2)$$

with $\vec{q}=k\vec{\rho}/f$.

For extended traps that lie entirely within the focal plane, the projected field may be approximated by an infinitesimally fine thread of light $u_f(\vec{r})\approx a_0(s)\exp(i\phi_0(s))\delta(\vec{r}-\vec{r}_0(s))$, where $\vec{r}_0(s)=(x_0(s),y_0(s))$. Equation (2) then yields a hologram associated with this idealized design. The projected field comes to a focus of finite width because Eq. (2) naturally incorporates contributions from self-diffraction.

Extending this to more general three-dimensional curves poses challenges that have been incompletely addressed in previous studies. The field $u(\vec{r},z)$ at height z above the focal plane is related to the field in the focal plane by the Rayleigh-Sommerfeld diffraction integral, which is expressed conveniently with the Fourier convolution theorem as $$u(\vec{r},z)=\exp(-ikz)\int H_z(\vec{q})\tilde{u}_f(\vec{q})\exp(i\vec{q}\cdot\vec{r})d^2q, \quad (3)$$

where $$H_z(\vec{q})=\exp(iz(k^2-q^2)^{1/2}) \quad (4)$$

is the Fourier transform of the Rayleigh-Sommerfeld propagator. Ideally, $u_f(\vec{r})$ would be associated with a three-dimensional field $u(\vec{r},z)$ that satisfies $u(\vec{r}_0(s), z_0(s))=a(s)\exp(i\phi(s))$. Equation (3), however, is not simply invertible unless $u(\vec{r},z)$ is completely specified on a single plane, z. In the absence of such a comprehensive description, one embodiment utilizes an approximation:

$$u(\vec{r},z)=\exp(-ikz)\int a_0(s)\exp(-i\phi_0(s))\exp(ikz_0(s))H_{-z_0(s)}(\vec{q})\exp(-i\vec{q}\cdot\vec{r}_0(s))ds \quad (5)$$

that arises from simple superposition of contributions from each element of the curve. Equation (5) is not an inversion of Eq. (3) because it neglects light propagating from one region of $\vec{R}_0(s)$ interfering with light elsewhere along the curve. In this sense, it resembles the "gratings and lenses" algorithm developed for projecting point-like optical traps, which also fails to account for cross-talk. The Rayleigh-Sommerfeld propagator improves upon the simpler parabolic phase profiles used for axial displacements in these earlier studies.

As an application of Eq. (5), one embodiment utilizes a uniformly bright ring trap of radius R, rotated by angle $\beta$ about the $\hat{y}$ axis. The trap's focus follows the curve $$\vec{R}_0(s) = R\left(\cos\left(\frac{s}{R}\right)\cos\beta,\ \sin\left(\frac{s}{R}\right),\ \cos\left(\frac{s}{R}\right)\sin\beta\right), \quad (6)$$

with the arc length ranging from s=0 to s=2πR. Equations (2) and (5) then yield the hologram $$u_h(\vec{\rho})=J_0(A(\vec{\rho})) \quad (7)$$

up to arbitrary phase factors, where $J_0(.)$ is the Bessel function of the first kind of order zero and) $A(\vec{\rho})$ satisfies $$\left(\frac{2fA(\vec{\rho})}{kR}\right)^2 = \xi^2 + \left[\eta\cos\beta + (4f^2+\rho^2)^{1/2}\sin\beta\right]^2. \quad (8)$$

This reduces to $$u_h(\vec{\rho}) = J_0\left(\frac{kR}{2f}\rho\right) \quad (9)$$

when $\beta=0$, which is the previously reported result for a holographic ring trap aligned with the focal plane.

Figure 2A:
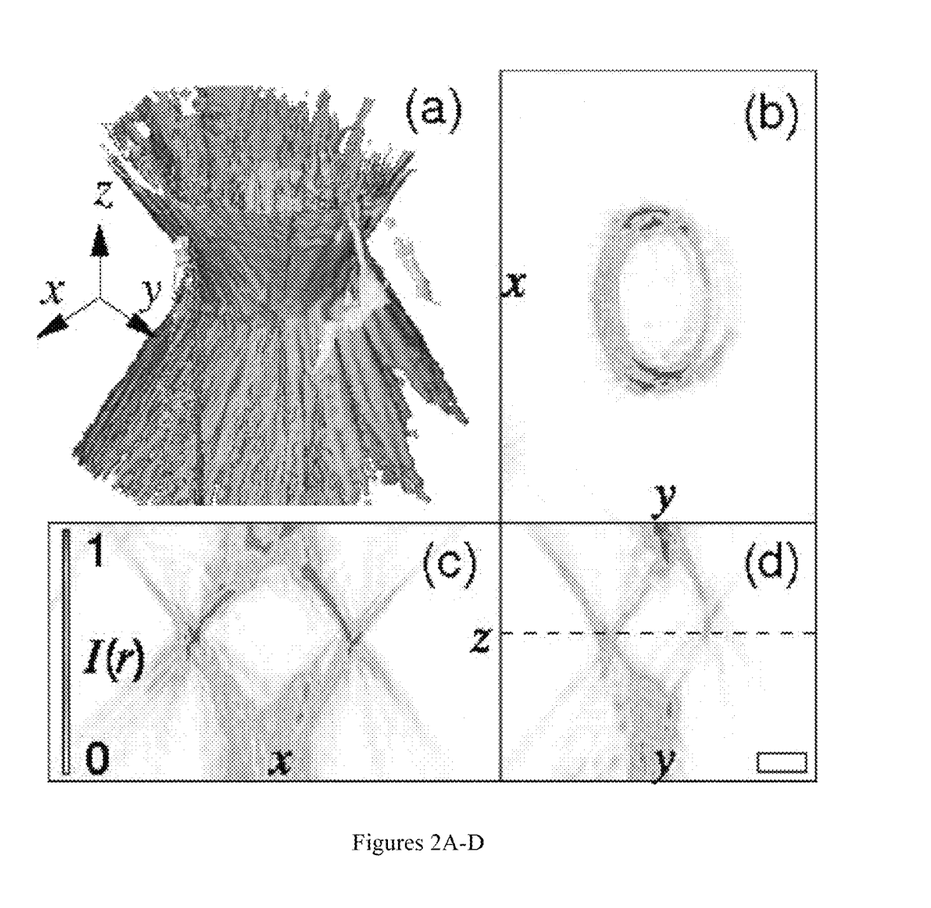
FIG. 2(a) is a volumetric reconstruction of a tilted ring trap.

FIG. 2(a) is a volumetric reconstruction of the three-dimensional intensity distribution projected by the hologram in Eq. (7) of a ring trap of radius R=9 μm tilted at $\beta=\pi/4$ rad. This complex-valued hologram was approximated with a phase-only hologram using the shape-phase algorithm so that it could be projected with a conventional holographic optical trapping system. The light from a diode-pumped solid-state laser (Coherent Verdi, $\lambda$=532 nm) was imprinted with the computed hologram by a phase-only liquid-crystal spatial light modulator (Hamamatsu X8267-16 PPM) and relayed to the input pupil of an oil-immersion objective lens (Nikon Plan-Apo, 100×, numerical aperture 1.4) mounted in a conventional light microscope (Nikon TE-2000U). Transverse slices of the projected intensity distribution, such as the example in FIG. 2(b), were obtained by mounting a front-surface mirror on the microscope's sample stage and moving the trap with respect to the focal plane. Light reflected by the mirror was collected by the same objective lens and relayed to a video camera (NEC TI-324A II) for recording. A sequence of such slices obtained in axial steps of $\Delta z$=0.1 μm was stacked to create a volumetric map of the trap's intensity. The surface in FIG. 2(a) encompasses the brightest 70 percent of the pixels in each slice. The axial sections through the volume in FIGS. 2(c) and (d) confirm the inclination of the ring.

Figure 3A:
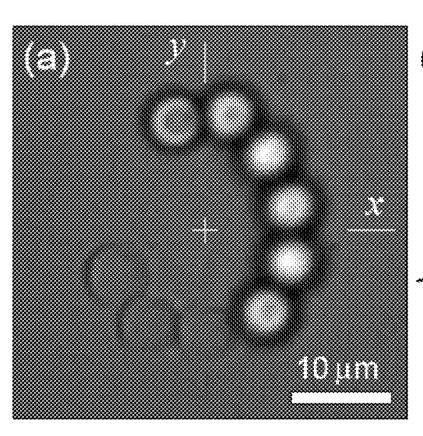
FIG. 3(a) is a bright-field microscope image of 5.17 um diameter colloidal silica spheres trapped on an inclined ring.
Figure 3B:
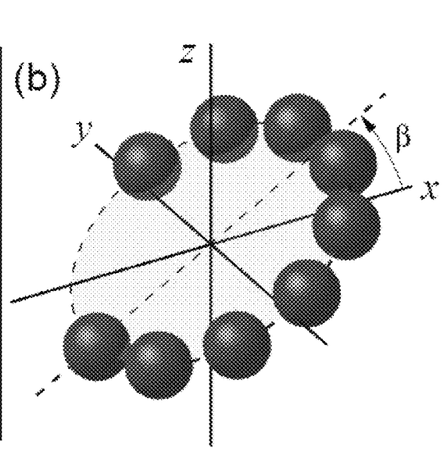
FIG. 3(b) is a schematic representation of the geometry in FIG. 3(a).

FIG. 3 shows a typical bright-field image of 5.17 μm diameter silica spheres dispersed in water and trapped on the inclined ring. A sphere's appearance varies from bright to dark depending on its axial distance from the microscope's focal plane. This dependence can be calibrated to estimate the sphere's axial position. The image in FIG. 3 is consistent with the designed inclination of the ring trap and therefore demonstrates the efficacy of Eqs. (2) and (5) for designing three-dimensionally extended optical traps.

In addition to extending an optical trap's intensity along a three-dimensional curve, Eq. (5) also can be used to specify the extended trap's phase profile. Imposing a uniform phase gradient, $\phi_l(s)=l(s|R)$, redirects the light's momentum flux to create a uniform phase-gradient force directed along the trap. In the particular case of a ring trap, this additional tangential force may be ascribed to orbital angular momentum in the beam that is independent of the light's state of polarization and makes trapped particles circulate around the ring. This principle can be applied also to inclined ring traps.

Unlike a horizontal ring trap at $\beta=0$, the inclined ring inevitably has phase variations along its circumference, $\phi_0(s)=kz(s)$, whose azimuthal gradient $\partial_s\phi(s)=-k \sin(s|R) \sin \beta$ tends to drive trapped objects to the downstream end of the ring. Adding $\phi_l(s)$ to this intrinsic phase profile creates a tilted ring trap described by the hologram $$u_h(\vec{p}) = J_l(A(\vec{p}))\exp\left(2\pi i l \frac{s}{R}\right) \qquad (10)$$

whose additional circumferential phase gradient that tends to drive particles around the ring. Here, $J_l(.)$ is the Bessel function of the first kind of order l. A particle should circulate continuously if this tangential gradient is large enough to overcome the overall downstream gradient, which occurs for $l>n_m(R/\lambda) \sin \beta$. Diffraction limits the maximum value of l that can be imposed on a ring trap of radius R. This, in turn, limits the maximum tilt angle β for which free circulation is possible.

The images in FIG. 3 were obtained with no imposed phase gradient, l=0. Increasing l to 20 directs enough of the beam's radiation pressure in the tangential direction to drive the spheres around the ring at roughly 0.2 Hz.

Figure 4A:
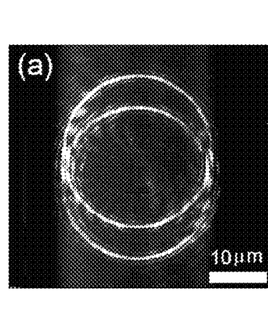
FIG. 4(a) illustrates intensity in the focal plane of the microscope of two tiled ring traps projected simultaneously with opposite inclination, $\beta=\pm\pi/8$
Figure 4B:
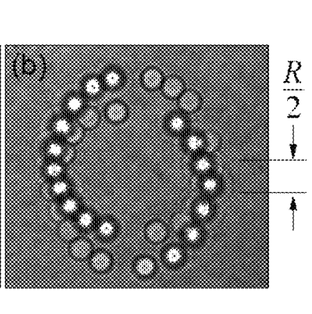
FIG. 4(b) illustrates colloidal silica spheres trapped in three dimensions within the focused Hopf link.
Figure 4C:
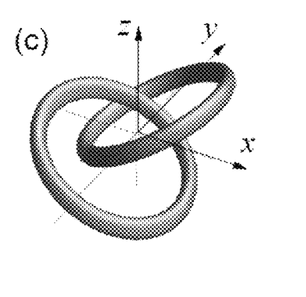
FIG. 4(c) is a schematic representation of the three-dimensional intensity distribution responsible for the image in FIG. 4(a).

The same formalism can be used to make more complicated three-dimensional trapping fields. The image in FIG. 4(a) shows the intensity in the focal plan of two tilted ring traps of radius R=12.9 μm projected simultaneously but with opposite inclination, $\beta=\pm\pi/8$. Setting these rings' separation to R/2 creates a pair of interlocking bright rings in the form of a Hopf link. These interpenetrating rings still act as three-dimensional optical traps, and are shown in FIG. 4(b) organizing 3.01 μm diameter colloidal silica spheres. The trapped spheres pass freely past each other along the two rings. FIG. 4(c) offers a schematic view of the Hopf link geometry.

In one embodiment, the knotted optical trap comprises two or more tilted ring traps projected simultaneously. The two or more tilted ring traps may be projected simultaneously by a single hologram. In one embodiment, the interpenetrate to form a Hopf link. The two or more interpenetrating tilted ring traps may be created with values of l (Equation 10) not equal to zero such that the knotted trap creates a knotted force field.

This knotted light field differs from previously reported knotted vortex fields in that its intensity is maximal along the knot, rather than minimal. In this respect, holographically projected Hopf links more closely resemble the Ranada-Hopf knotted fields that have been predicted for strongly focused circularly polarized optical pulses. Knotted force fields arise in this latter case from knots in each pulse's magnetic field. Linked ring traps are not knotted in this sense. Nevertheless, the programmable combination of intensity-gradient and phase-gradient forces in linked ring traps can create a constant knotted force field for microscopic objects. Beyond their intrinsic interest, such knotted optical force fields have potential applications in plasma physics for inducing knotted current loops and could serve as mixers for biological and soft-matter systems at the micrometer scale.

In one embodiment, knotted optical force fields are created using intensity gradients to hold microscopic objects in place, and phase gradients to thread them through the knot. These optical knots are a special case of a very general class of three-dimensional optical traps that can be created with the holographic techniques.

These extended traps are useful for moving small objects such as biological cells through microfluidic lab-on-a-chip devices. They can be used to measure vanishingly small interactions among such objects. This is useful for medical diagnostic tests, among many other things.

Aside from being a compelling and aesthetically pleasing demonstration of the use of a static beam of light and of optical traps, such knots provide useful applications. The biggest potential application currently foreseen is for creating knotted current loops in high-temperature plasmas. This is a long sought-after goal for developing fusion energy as a practical power source.

In one embodiment, the holograms are projected through use of a liquid-crystal spatial light modulator. The spatial light modulator imprints a hologram that is calculated onto an ordinary laser beam. Bringing the modified beam to a focus then creates the knot. The pattern that is calculated and the light field that it projects are both referred to in the art as holograms.

As noted above, one application of the described knotted force fields is with fusion energy. Fusion reactors work by colliding light atomic nuclei into each other so hard that the nuclei fuse into heavier elements, releasing large amounts of energy in the form of hot neutrons. The best way to do this is to heat the light atoms to a high enough temperature that their kinetic energy can overcome all of the barriers to fusion during random collisions. At those temperatures, the atoms' electrons ionize and the gas becomes a plasma. The use of materials in the plasma state is also beneficial because large electric currents can be passed through the plasma, allowing for an effective means of heating the material. Further, this allows for a mechanism of controlling the plasma, as magnetic fields can be utilized on the currents to contain the hot plasma, thereby preventing it from destroying its physical container.

Currently, one of the major problems with fusion reactors, and high temperature plasma in general, is the instability of the plasma. Unstable plasma can result in a loss of kinetic energy within the plasma and localized cooling. The heat and movement of the plasma can also damage the container holding the plasma. The energy lost to such effects cools the plasma and generally prevents the process from generating a net gain in energy.

However, it is believed that if the currents in a plasma were tied in a knot, the knot would eliminate most, if not all of these instabilities because the magnetic field lines generated by the knotted current cannot pass through each other. Therefore, projecting a knotted optical force field, in accordance with the present invention, into a plasma can provide a way to initiate a knotted current loop within the plasma. The knotted current then can be ramped up by other conventional means to heat the plasma. The result of this procedure would be a stable high-temperature plasma containing a knotted current loop for such applications as plasma fusion power generation.

A knotted force field is utilized to initialize a knotted current loop in the plasma. Once initiated, the current in the knotted loop can be ramped up by inductive coupling, much as in conventional tokamak design. Inductive coupling itself can not initiate a knotted current loop, thus a source is necessary, provided by one embodiment of the invention, to initialize the current loop that inductive coupling can then ramp up. The knotted current loop then can be used to heat the plasma without the deleterious effects of plasma instabilities that are known with current plasma fusion reactor designs based upon conventional current loops that do not have knots.

One embodiment of the invention utilizes small particles to initiate a knotted current loop in a plasma. One approach is to inject small particles, dust for example, into the initial relatively cold plasma, and to accelerate the particles around a knotted path using the knotted optical force field. To do this, a wavelength of light is chosen that is absorbed weakly by the plasma, but interacts strongly with the particles in such a way that illuminated particles are driven around the knotted path by the knotted Optical force field. The circulating particles will inevitably carry a charge in a plasma, as is well known from the study of so-called dusty plasmas. The circulating particles will induce a current loop along their path. If their path is knotted, then the current loop the particles trace out also will be knotted. Enhancing the current by inductive coupling will heat the plasma, burning off the particles. Once the current is initiated, however, it will persist, even without the particles.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of creating a extended optical trap comprising:
    generating a collimated beam of light;
    imprinting a hologram on the beam of light;
    projecting the beam of light through an objective lens; and
    focusing the projected beam of light along a curve $\vec{R}_0(s)=(x_0(s),y_0(s),z_0(s))$, parameterized by its arc length s, along which the amplitude $a_0(s)$ and phase $\phi_0(s)$ are specified independent of each other in three dimensions.

2. The method of claim 1, further wherein a light field associated with the extended optical trap has a maximal intensity along curve.

3. The method of claim 2, wherein the extended optical trap is associated with a light field $u(\vec{r},z)$, such that $$u(\vec{r},z)=\exp(-ikz)\int a_0(s)\exp(-i\phi_0(s))\exp(ikz_0(s))H_{-z_0(s)}(\vec{q})\exp(-i\vec{q}\cdot\vec{r}_0(s))ds.$$

4. The method of claim 1, wherein the extended optical trap comprises a ring trap of radius R, rotated by angle β about the ŷ axis such that the trap's focus follows the curve $$\vec{R}_0(s) = R\left(\cos\left(\frac{s}{R}\right)\cos\beta, \sin\left(\frac{s}{R}\right), \cos\left(\frac{s}{R}\right)\sin\beta\right),$$

with the arc length ranging from s=0 to s=2πR.

5. The method of claim 4, wherein the hologram is described by:

$$u_h(\vec{\rho}) = J_0\left(\frac{kR}{2f}\rho\right)$$

when β=0.

6. The method of claim 1, wherein the extended optical trap comprises a tilted ring trap described by the hologram $$u_h(\vec{\rho}) = J_l(A(\vec{\rho}))\exp\left(2\pi i l\frac{s}{R}\right)$$

where $J_l(.)$ is the Bessel function of the first kind of order l.

7. The method of claim 6, wherein the tilted ring trap consists of two or more tilted ring traps projected simultaneously.

8. The method of claim 7 wherein the two or more tilted ring traps are projected simultaneously by a single hologram.

9. The method of claim 8, wherein the two or more tilted ring traps interpenetrate to form a Hopf link.

10. The method of claim 9, wherein each of the two or more interpenetrating tilted ring traps are created with values of l not equal to zero such that the optical ring trap creates a force field.

11. An apparatus for creating a extended optical trap comprising:
    a collimated light source;
    a spatial light modulator;
    an objective lens,
    wherein a beam of light from the collimated light is imprinted by the spatial light modulated with a hologram projecting the beam of light along a curve $\vec{R}_0(s)=(x_0(s),y_0(s),z_0(s))$, parameterized by its arc length s, along which the amplitude $a_0(s)$ and phase $\phi_0(s)$ are specified of each other in three dimensions.

12. The apparatus of claim 11, further wherein a light field associated with the extended optical trap has a maximal intensity along the extended optical trap.

13. The apparatus of claim 11, wherein the extended optical trap is associated with a light field $u(\vec{r},z)$, such that $$u(\vec{r},z)=\exp(-ikz)\int a_0(s)\exp(-i\phi_0(s))\exp(ikz_0(s))H_{-z_0(s)}(\vec{q})\exp(-i\vec{q}\cdot\vec{r}_0(s))ds.$$

14. The apparatus of claim 11, wherein the extended optical trap comprises a ring trap of radius R, rotated by angle β about the ŷ axis such that the trap's focus follows the curve:

$$\vec{R}_0(s) = R\left(\cos\left(\frac{s}{R}\right)\cos\beta, \sin\left(\frac{s}{R}\right), \cos\left(\frac{s}{R}\right)\sin\beta\right),$$

with the arc length ranging from s=0 to s=2πR.

15. The apparatus of claim 14, wherein the holograph is described by:

$$u_h(\vec{\rho}) = J_0\left(\frac{kR}{2f}\rho\right)$$

when β=0.

16. The apparatus of claim 11, wherein the extended optical trap comprises a tilted ring trap described by the hologram $$u_h(\vec{\rho}) = J_l(A(\vec{\rho}))\exp\left(2\pi i l \frac{s}{R}\right)$$

where $J_l(.)$ is the Bessel function of the first kind of order l.

17. The apparatus of claim 11, wherein the extended optical trap comprises two or more tilted ring traps projected simultaneously.

18. The apparatus of claim 17 wherein the two or more tilted ring traps are projected simultaneously by a single hologram.

19. The apparatus of claim 18, wherein the two or more tilted ring traps interpenetrate to form a Hopf link.

20. The apparatus of claim 19, wherein each of the two or more interpenetrating tilted ring traps are created with values of l not equal to zero such that the holographic optical ring trap creates a force field.

\* \* \* \* \*

UNITED STATES PATENT AND TRADEMARK OFFICE
CERTIFICATE OF CORRECTION

PATENT NO. : 8,921,763 B2  
APPLICATION NO. : 13/411142  
DATED : December 30, 2014  
INVENTOR(S) : David G. Grier and Elisabeth R. Shanblatt It is certified that error appears in the above-identified patent and that said Letters Patent is hereby corrected as shown below:

In the Claims

Column 8, Claim 6, line 20, please change "$u_h(\vec{p}) = J_l(A(\vec{p})) \exp\left(2\pi i\, 1\frac{s}{R}\right)$" with -- $u_h(\vec{p}) = J_\ell(A(\vec{p})) \exp\left(2\pi i\, \ell\frac{s}{R}\right)$ --.

Column 8, Claim 6, line 23, replace "$J_1(.)$" with -- $J_\ell(.)$ -- and "order 1" with -- order $\ell$ --.

Column 8, Claim 10, line 32, please change "of 1" with -- of $\ell$ --.

Column 9, Claim 16, line 11, please change "$u_h(\vec{p}) = J_l(A(\vec{p})) \exp\left(2\pi i\, 1\frac{s}{R}\right)$" with -- $u_h(\vec{p}) = J_\ell(A(\vec{p})) \exp\left(2\pi i\, \ell\frac{s}{R}\right)$ --.

Column 9, Claim 16, line 14, replace "$J_1(.)$" with -- $J_\ell(.)$ -- and "order 1" with -- order $\ell$ --.

Column 9, Claim 20, Line 25, please replace "of 1" with -- of $\ell$ --.

Signed and Sealed this  
Fourteenth Day of April, 2015

Michelle K. Lee  
*Director of the United States Patent and Trademark Office*